United States Patent
Trail et al.

(10) Patent No.: US 10,832,051 B1
(45) Date of Patent: Nov. 10, 2020

(54) EYE TRACKING USING OPTICAL COHERENCE METHODS

(71) Applicant: Facebook Technologies, LLC, Menlo Park, CA (US)

(72) Inventors: Nicholas Daniel Trail, Bothell, WA (US); Robert Dale Cavin, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/593,555

(22) Filed: May 12, 2017

Related U.S. Application Data

(60) Provisional application No. 62/349,464, filed on Jun. 13, 2016.

(51) Int. Cl.
| | |
|---|---|
| *A61B 5/00* | (2006.01) |
| *A61B 3/15* | (2006.01) |
| *G06K 9/00* | (2006.01) |
| *G06F 3/01* | (2006.01) |
| *G06T 7/73* | (2017.01) |
| *G01B 9/02* | (2006.01) |
| *G01B 11/00* | (2006.01) |

(52) U.S. Cl.
CPC ..... *G06K 9/00604* (2013.01); *G01B 9/02091* (2013.01); *G01B 11/002* (2013.01); *G06F 3/013* (2013.01); *G06K 9/0061* (2013.01); *G06T 7/75* (2017.01); *G06T 2207/30201* (2013.01)

(58) Field of Classification Search
CPC ............. G06K 9/00604; G06K 9/0061; G01B 11/002; G01B 9/02091; G06F 3/013; G06T 7/75; G06T 2207/30201
See application file for complete search history.

(56) References Cited

U.S. PATENT DOCUMENTS

| | | | | |
|---|---|---|---|---|
| 5,949,520 A | * | 9/1999 | Heacock | A61B 3/1025 351/221 |
| 5,997,141 A | * | 12/1999 | Heacock | A61B 3/1225 351/221 |
| 6,741,359 B2 | * | 5/2004 | Wei | A61B 3/102 351/221 |

(Continued)

OTHER PUBLICATIONS

United States Office Action, U.S. Appl. No. 15/982,896, dated Jun. 27, 2019, 16 pages.

(Continued)

*Primary Examiner* — Philip P. Dang
(74) *Attorney, Agent, or Firm* — Fenwick & West LLP

(57) ABSTRACT

A system tracks eye movement using optical coherence in a head mounted display. The system includes an illumination source configured to project low coherence interference light onto a portion of a user's eye. The system includes a scanning system to select an axial position within the illuminated portion of the user's eye. The system includes a detector configured to collect light reflected from the illuminated portion of the user's eye at the selected axial position, and the reflected light includes measurement data characterizing the illuminated portion of the user's eye. The system includes a controller configured to compare the measurement data with a trained baseline, and determine an eye position based the comparison.

20 Claims, 8 Drawing Sheets

(56) References Cited

U.S. PATENT DOCUMENTS

| | | | | |
|---|---|---|---|---|
| 7,474,407 | B2* | 1/2009 | Gutin | A61B 5/0066 356/479 |
| 7,505,142 | B2* | 3/2009 | Knighton | A61B 3/102 356/479 |
| 7,513,619 | B2* | 4/2009 | Lacombe | A61B 3/102 351/205 |
| 8,356,900 | B2* | 1/2013 | Zhou | A61B 3/1015 351/214 |
| 8,394,084 | B2* | 3/2013 | Palankar | A61F 9/00736 606/6 |
| 8,416,276 | B2* | 4/2013 | Kroll | G03H 1/0005 348/14.02 |
| 8,416,479 | B2* | 4/2013 | Kroll | G03H 1/02 359/32 |
| 8,678,591 | B2* | 3/2014 | Zhou | A61B 3/1015 351/214 |
| 8,834,565 | B2* | 9/2014 | Ben Nun | A61F 2/1613 623/6.22 |
| 8,919,957 | B2* | 12/2014 | Zhou | A61B 3/0025 351/205 |
| 8,939,583 | B2* | 1/2015 | Borycki | A61B 3/102 351/208 |
| 8,958,137 | B2* | 2/2015 | Haussler | G03H 1/02 359/9 |
| 8,970,847 | B2* | 3/2015 | Ono | A61B 3/102 356/497 |
| 9,101,292 | B2* | 8/2015 | Zhou | A61B 3/1015 |
| 9,198,573 | B2* | 12/2015 | Raymond | A61B 3/102 |
| 9,211,062 | B2* | 12/2015 | Sakagawa | A61B 3/113 |
| 2003/0053219 | A1* | 3/2003 | Manzi | A61F 9/00836 359/676 |
| 2010/0118117 | A1* | 5/2010 | Kroll | G03H 1/02 348/40 |
| 2011/0149018 | A1* | 6/2011 | Kroll | G03H 1/02 348/40 |
| 2013/0170004 | A1* | 7/2013 | Futterer | G02B 6/0046 359/9 |
| 2014/0028997 | A1* | 1/2014 | Cable | G01B 9/02091 356/51 |
| 2014/0055749 | A1* | 2/2014 | Zhou | A61B 3/0025 351/214 |
| 2014/0276361 | A1* | 9/2014 | Herekar | A61N 5/062 604/21 |
| 2015/0032090 | A1* | 1/2015 | Gonzalez | A61B 3/103 606/4 |
| 2015/0208916 | A1* | 7/2015 | Hayashi | A61B 3/0083 351/208 |
| 2015/0268399 | A1* | 9/2015 | Futterer | G02B 6/005 315/151 |
| 2015/0294468 | A1* | 10/2015 | Shimizu | G01B 9/02091 356/479 |
| 2015/0313466 | A1* | 11/2015 | Yoshida | A61B 5/0066 600/425 |
| 2015/0313467 | A1* | 11/2015 | Sakai | A61B 3/102 351/208 |
| 2016/0026253 | A1* | 1/2016 | Bradski | G02B 27/225 345/8 |
| 2016/0077337 | A1* | 3/2016 | Raffle | G06F 3/013 345/156 |
| 2016/0166143 | A1 | 6/2016 | Goto | |
| 2017/0000335 | A1 | 1/2017 | Samec et al. | |
| 2018/0149874 | A1 | 5/2018 | Aleem et al. | |
| 2019/0183584 | A1 | 6/2019 | Schneider et al. | |

OTHER PUBLICATIONS

United States Office Action, U.S. Appl. No. 15/982,896, dated Dec. 26, 2019, 18 pages.

United States Office Action, U.S Appl. No. 15/982,896, dated May 14, 2020, 17 pages.

* cited by examiner

EYE TRACKING USING OPTICAL COHERENCE METHODS

CROSS REFERENCE TO RELATED APPLICATIONS

This application claims the benefit of U.S. Provisional Application No. 62/349,464, filed Jun. 13, 2016, which is incorporated by reference in its entirety.

BACKGROUND

The present disclosure generally relates to eye tracking, and specifically relates to using optical coherence for eye tracking in virtual reality and/or augmented reality applications.

Virtual reality systems typically include a display panel that presents virtual reality images, which may depict elements belonging only to a virtual reality environment. The display panel may also combine real elements (e.g., tall grass in the physical world) with virtual elements (e.g., an anime animal hiding in the tall grass), as in augmented reality applications. To interact with the virtual reality system, a user makes inputs directed toward a portion of the virtual reality image. Some virtual reality systems include a dedicated peripheral to translate hand and finger movements into input signals. However, traditional peripherals artificially separate the user from the virtual environment, which prevents the user from having a fully immersive experience in the virtual environment. Eye tracking systems provide a more immersive experience through correlation of the end-users gaze and attention, as well as facilitate a seamless interface than that predominantly reliant on a handheld peripheral. However, existing eye tracking systems are unsuitable for use in a portable, lightweight, and high-performance virtual or augmented reality headset.

SUMMARY

A system is configured to track eye position using optical coherence in a head mounted display in a VR environment, an augmented reality (AR) environment, a mixed reality (MR) environment, or some combination thereof. In some embodiments, the system includes an illumination source configured to project low coherence interference light onto a portion of a user's eye. For example, the illumination source is a low coherence light source. The illumination source may illuminate a point, a line, or an area of the user's eye. The system includes a scanning system to select an axial position within the illuminated portion of the user's eye. For example, the scanning system is a reference mirror. By changing positions of the reference mirror, the reference system varies the axial position within the illuminated portion of the user's eye. In another example, the reference system varies a lateral position of the illuminated portion of the user's eye. The system includes a detector configured to collect light reflected from the illuminated portion of the user's eye at the selected axial position, and the reflected light includes measurement data characterizing the illuminated portion of the user's eye. For example, the measurement data is collected at different time points during eye movement. The measurement data at a given time point can be 1-dimensional (1D) dataset, 2-dimensional (2D) dataset, or 3-dimensional (3D) dataset. The system includes a controller configured to compare the measurement data with a trained baseline, and to determine an eye position based the comparison.

Figure 1:
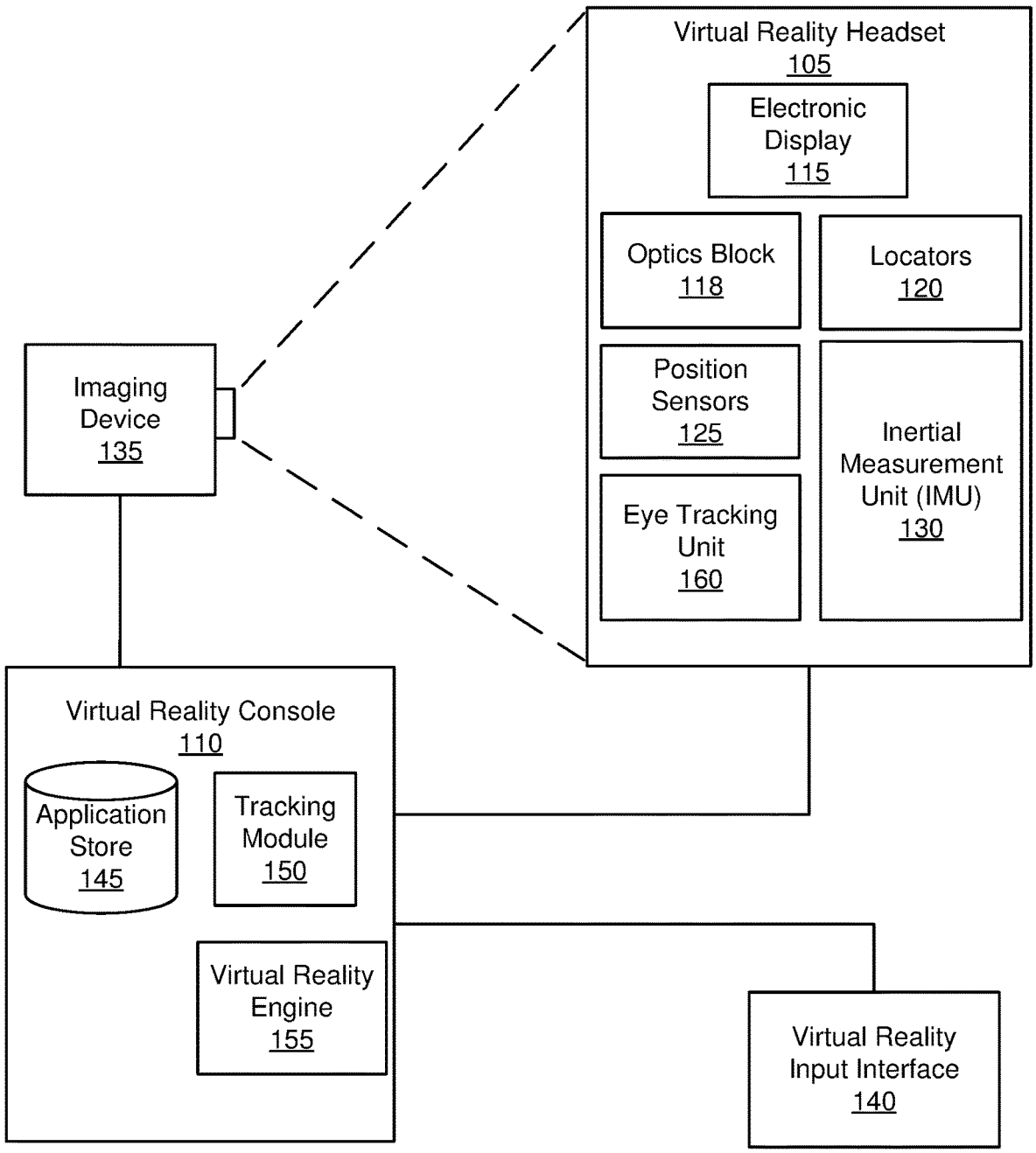
FIG. 1 is a block diagram of a virtual reality system environment, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

An eye tracking system in a head mounted display, measures apparent index change and scattering surfaces through a portion of a user's eye (e.g., a point, a line or a small area of sclera, cornea) using optical coherence techniques (similar to the concept employed in Optical Coherence Tomography, or OCT). The system includes an illumination source (e.g., a relatively low coherence light source) to project controlled coherence light onto a portion of the user's eye, a detector (e.g., photodetector) to collect back-reflected and/or backscattered light from the illuminated portion of the eye, and a reference system (e.g., a reference mirror, nominally flat to spherical in shape) to act as the reference and compensate for the expected errors at the given focus plane over the illuminated portion of the eye. This reference system can be fixed to a static depth to reduce complexity and increase stability, or provide for active depth corrections to account for the potential population variance in facial interface depths enlarging the scan/data volume captured (either accomplished in a singlet calibration, or dynamically to improve tracking resiliency as needed in the end-system). The difference therein is that either path may be chosen based upon being the simpler approach given a population variance to cover, i.e., design the system to work over a larger depth error range, or design in a depth correction to work with the vast majority of the human population. Either way, a user profile would be generated that would allow a depth offset correction to improve tracking quality metrics, by working within an acceptable depth plane range of that specific user. The collected light for each data point that corresponds to an apparent scatter site or index change over a finite lateral area in the illuminated portion of the eye. By measuring across multiple lateral positions, a 2-dimensional dataset of the eye is recorded (at the current depth plane/region). This data set is mapped to a position of the eye, and the mapping may then be used to track the position of the eye as the users gaze position changes. As an example, if the system captures a two dimensional (2D) data array at a set depth, the inherent features from the backreflection/backscatter light may be correlated to future datasets captures to determine to an X/Y-axis offset to increase correlation. This technique is sometimes referred to as digital image correlation or optical flow. As such, this system does not need to capture a full volumetric data set, as usually employed in classical OCT systems, but rather focusing on the pertinent aspects relevant to optical eye tracking. This requires at least (and preferably) a single depth plane for data collection (wherein there exists a single, 1D or 2D data point set instantaneous capture). That said, the optional capability for optical coherent imaging techniques to add both coarse (for initial calibration to a user's facial interface) and fine (for improving tracking quality by creating a finite 3D data set, even of just a few layers) depth information is considered a strength of this method.

System Overview

FIG. 1 is a block diagram of a virtual reality (VR) system environment 100 in which a VR console 110 operates. The VR system environment 100 shown by FIG. 1 comprises a VR headset 105, an imaging device 135, and a VR input interface 140 that are each coupled to the VR console 110. While FIG. 1 shows an example VR system environment 100 including one VR headset 105, one imaging device 135, and one VR input interface 140, in other embodiments any number of these components may be included in the VR system environment 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the VR system environment 100. Similarly, functionality of one or more of the components can be distributed among the components in a different manner than is described here. For example, some or all of the functionality of the VR console 110 may be contained within the VR headset 105.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. Some embodiments of the VR headset 105 are further described below in conjunction with FIGS. 2 and 3. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset. In these embodiments, the VR headset 105 augments views of a physical, real-world environment with computer-generated elements (e.g., images, video, sound, etc.).

The VR headset 105 includes an electronic display 115, an optics block 118, one or more locators 120, one or more position sensors 125, an inertial measurement unit (IMU) 130, and an eye tracking unit 160. Some embodiments of the VR headset 105 have different components than those described here. Similarly, the functions can be distributed among other components in the VR system environment 100 in a different manner than is described here. For example, some of the functions of the eye tracking unit 160 may be performed by the VR console 110. The electronic display 115 displays images to the user in accordance with data received from the VR console 110.

The optics block 118 magnifies received light from the electronic display 115, corrects optical errors associated with the image light, and the corrected image light is presented to a user of the VR headset 105. The optical element is an optical element, such as an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as partial reflectors or anti-reflective coatings.

Magnification of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal comatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, and roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking unit 160 tracks a user's eye movement using an optical coherence (OC) module. The OC module includes a comparably low coherence (e.g., less than 50 millimeters) light source to project light onto a portion of the user's eye, a detector to collect backreflected and backscattered light from the illuminated portion of the eye at one or more axial (longitudinal) positions, and optionally if employing less than a 2-dimensional detector array, a scanning system to scan the illuminated portion of the eye at various lateral (horizontal and/or vertical at a given depth of the eye) positions. An axial position is a position along a longitudinal axis that intersects the illuminated portion of the eye. An axial position is generally located at a depth value that may range from a surface of the illuminated portion of the eye to some depth value below the surface of the illuminated portion of the eye. Different axial positions correspond to different depths from the surface of the illuminated portion. A lateral position is a position along a direction that is orthogonal to the longitudinal axis. For example, at a given axial position, a lateral position is orthogonal to the given axial position. Various lateral positions may correspond to the given axial positions. The collected light corresponds to a reflectance (and scatter) magnitude of the illuminated portion of the eye. The reflectance correlates with an apparent index change at a given depth plane location of a user's eye (e.g., a point, a line or a small area of sclera, cornea). This information is built into a 2D data set at each (if more than one) depth plane captured, where the resulting "image" is a digital representation of the coherent signal magnitude received. This in turn forms the basis for a temporal correlation algorithm (similar to optical flow) to track the eye position and orientation (for example, by tracking an acceptable correlation from dataset N to N+1, and so forth), which is discussed further in FIG. 5. In addition, the resulting "images" are mapped to a global model (also referred to as a trained baseline), to refine the eye position estimate as sample coverage and density increases. The OC module is discussed in detail below with regard to FIGS. 2B, 3, 4A, and 4B.

The eye tracking unit 160 uses the tracked eye movement to determine one or more characterization parameters. A characterization parameter characterizes a function that is based in part on the positions or movements of at least one of the user's eyes. A characterization parameter may be, e.g., an fixation point (where the user is looking), and gaze time (how long the user is looking a particular direction), a vengeance angle (an angle between two eyes when the user changes viewing distance and gaze direction), an interpupillary distance (IPD) of the user, an identification of the user, an eye's torsional state, some other function based on position of one or both eyes, or some combination thereof. In one embodiment, the eye tracking unit 160 may estimate different types of eye movements based on the detected characterization parameters. For example, if the eye tracking unit 160 detects a user looks at a same location for at least a threshold time, the eye tracking unit 160 determines the user's eye fixed on a particular point. If the eye tracking unit 160 detects the user rapidly shifting orientation back and forth between two points of fixation, the eye tracking unit 160 determines the user's eye movement is a saccade (e.g., may occur while reading, thinking, etc.). If the eye tracking unit 160 detects the user shifting orientation regularly for at least a threshold time, the eye tracking unit 160 determines the user' eye movement is smooth pursuit (e.g., following a moving object). Based on the detected eye movement, the eye tracking unit 160 communicates with the VR console 110 for further processing, as further explained below.

In some embodiments, the eye tracking unit 160 allows a user to interact with content presented to the user by the VR console 110 based on the detected eye movement. Example interactions by the user with presented content include: selecting a portion of content presented by the VR console 110 (e.g., selecting an object presented to the user), movement of a cursor or a pointer presented by the VR console 110, navigating through content presented by the VR console 110, presenting content to the user based on a gaze location of the user, or any other suitable interaction with content presented to the user.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more hardware and software filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides content to the VR headset 105 for presentation to the user in accordance with information received from one or more of: the imaging device 135, the VR headset 105, the VR input interface 140, and the eye tracking unit 160. In the example shown in FIG. 1, the VR console 110 includes an application store 145, a tracking module 150, and a VR engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the VR headset 105, the VR interface device 140, or the eye tracking unit 160. Examples of applications include: gaming applications, conferencing applications, video playback application, or other suitable applications.

The tracking module 150 calibrates the VR system environment 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the VR system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the VR system environment 100 and receives position information, acceleration information, velocity information, predicted future positions, or some combination thereof of the VR headset 105 and eye tracking unit 160 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Similarly, if information received from the eye tracking unit 160 indicates the user gazing on a location, the VR engine 155 generates content based on the identified gazing location, such as a visual representation of the scene at the gazing location with an original display resolution and surrounding scenes with a reduced display resolution. Additionally, in some embodiments, if the received information indicates that tracking of the eye tracking unit 160 is lost, the VR engine 155 generates content indicating the VR headset 105 needs to be adjusted for presentation by the VR headset 105. Additionally, the VR engine 155 performs an action within an application executing on the VR console 110 in response to an action request received from the VR input interface 140, or the eye tracking unit 160 and provides feedback to the user that the action was performed. The provided feedback may be visual or audible feedback via the VR headset 105 or haptic feedback via the VR input interface 140. For example, the VR engine 155 receives an action from the eye tracking unit 160 to open an application, so the VR engine 155 opens the application and presents content from the application to the user via the VR headset 105.

Example VR Headset

Figure 2A:
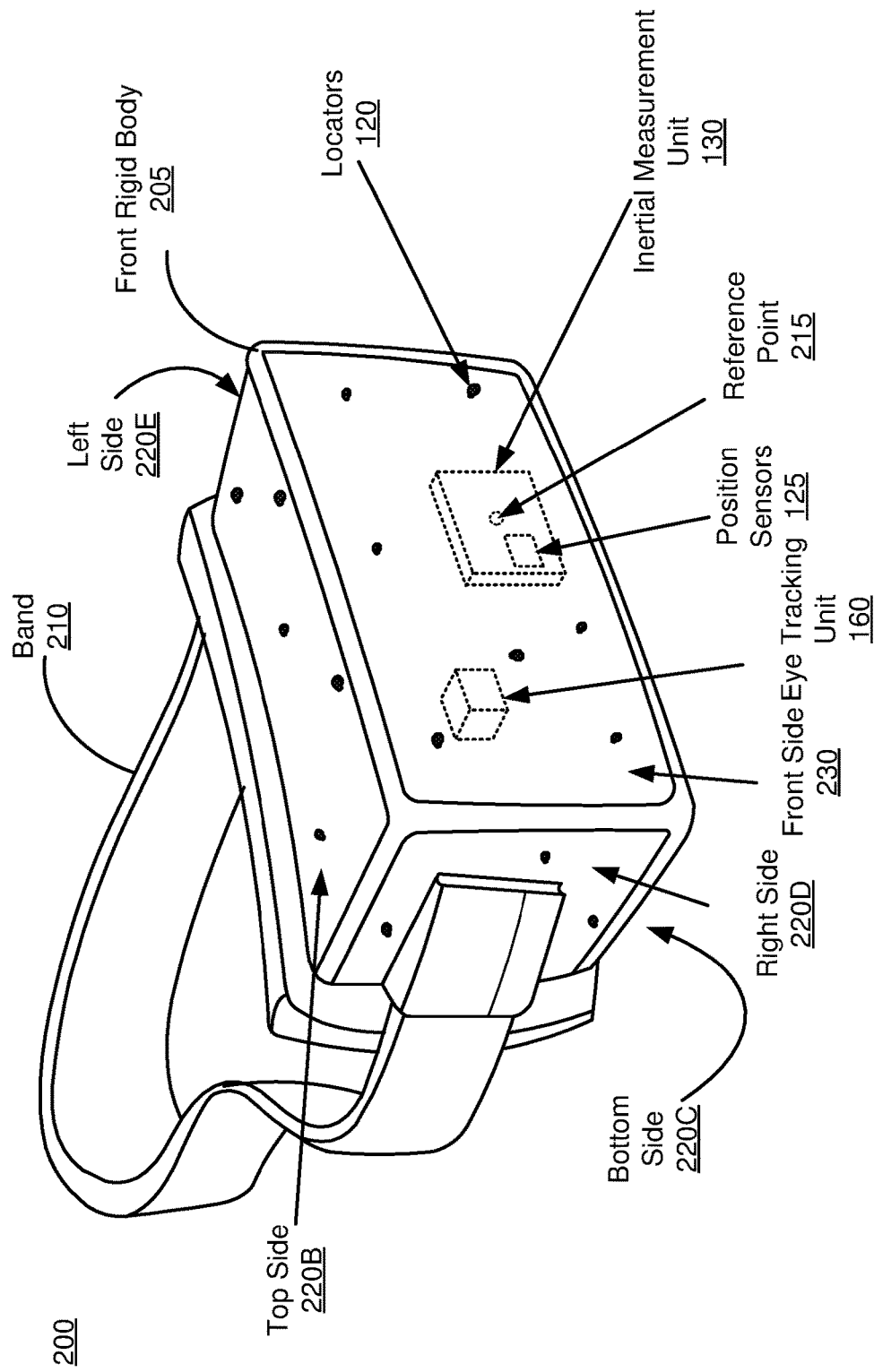
FIG. 2A is a diagram of a virtual reality headset, in accordance with an embodiment.

FIG. 2A is a diagram of a VR headset 200, in accordance with an embodiment. The VR headset 200 is an embodiment of the VR headset 105, and includes a front rigid body 205 and a band 210. The front rigid body 205 includes an electronic display element of the electronic display 115 (not shown in FIG. 2), the optics block 118 (not shown in FIG. 2), the IMU 130, the one or more position sensors 125, an eye tracking unit 160, and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

In the example of FIG. 2A, the eye tracking unit 160 is not visible from outside of the VR headset 200. The eye tracking unit 160 may or may not be in a line of sight of a user wearing the VR headset 200. However, the eye tracking unit 160 is typically located (virtually through mirrors, etc., or in actuality) off-axis to avoid obstructing the user's view of the electronic display 115, although the eye tracking unit 160 can alternately be placed elsewhere. Also, in some embodiments, there is at least one eye tracking unit for the left eye of the user and at least one tracking unit for the right eye of the user. In some embodiments, only one eye tracking unit 160 can track both left and right eye of the user.

Figure 2B:
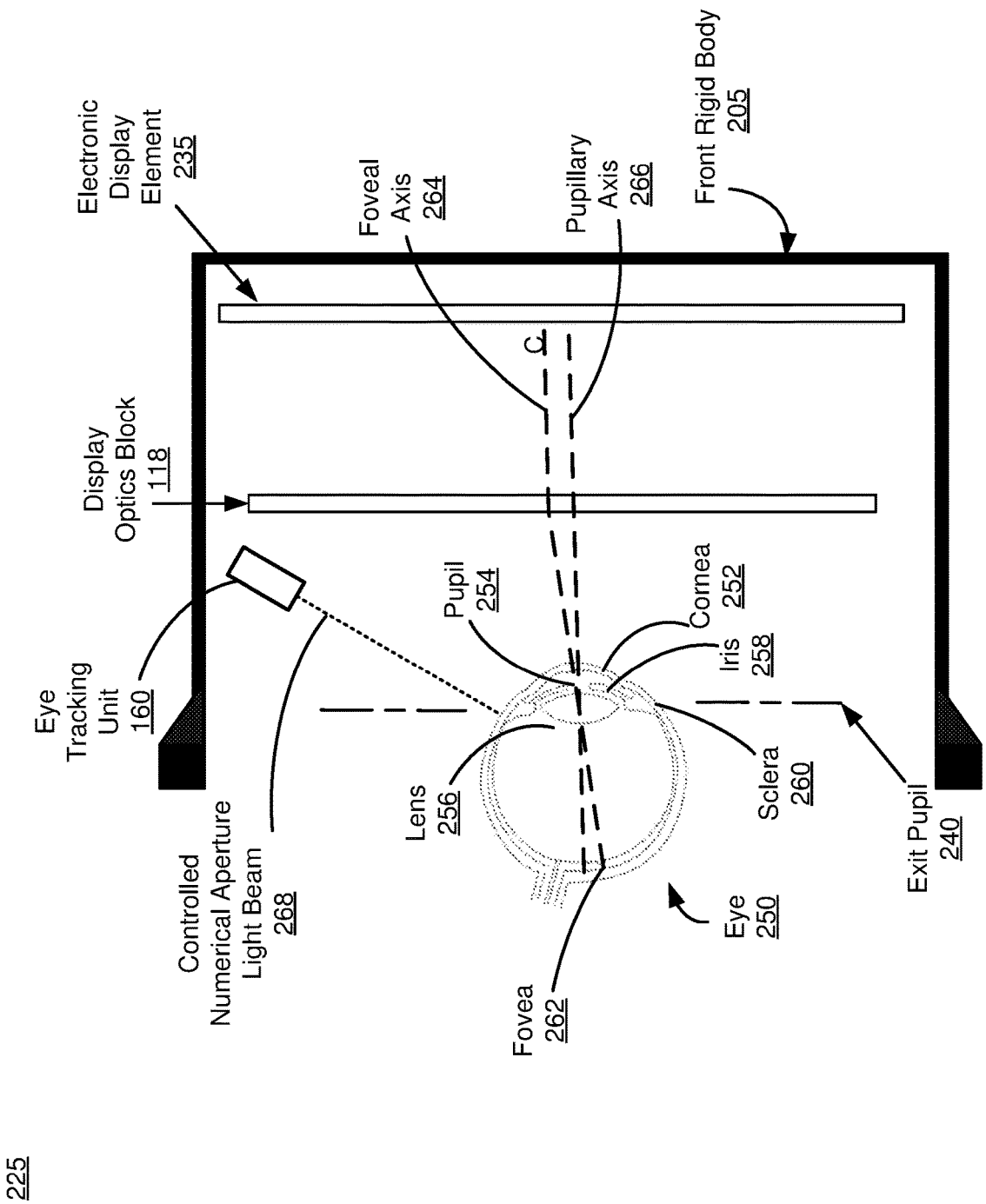
FIG. 2B is a cross-section view of a front rigid body of the virtual reality headset in FIG. 2A, in accordance with an embodiment.

FIG. 2B is a cross section 225 of the front rigid body 205 of the embodiment of a VR headset 200 shown in FIG. 2A. As shown in FIG. 2B, the display block 118, an electronic display element 235 of the electronic display 115, and the eye tracking unit 160. The electronic display element 235 emits image light toward the optics block 118. The optics block 118 magnifies the image light, and in some embodiments, also corrects for one or more additional optical errors (e.g., distortion, astigmatism, etc.). The optics block 118 directs the image light to an exit pupil 240 for presentation to the user. The exit pupil 240 is the location of the front rigid body 205 where a user's eye 250 is positioned. The eye tracking unit 160 tracks eye movement of the eye 250. For purposes of illustration, FIG. 2B shows a cross section 225 associated with a single eye 250, accordingly, a separate optics block 118 and/or electronic display element 235 may be used to provide altered image light to other eye of the user. Similarly, a separate eye tracking unit 160 may be used to track eye movement of the other eye of the user.

The eye 250 includes a cornea 252, a pupil 254, a lens 256, an iris 258, a sclera 260, and a fovea 262. The sclera 260 is the relatively opaque (usually visibly white) outer portion of the eye 250, which is often referred to as the "white of the eye." The cornea 252 is the curved surface covering the iris 258 and the pupil 254 of the eye 250. The cornea 252 is essentially transparent in the visible band (~380 nm to 750 nm) of the electromagnetic spectrum, and the near-infrared region (up to approximately 1,400 nm). The lens 256 is a transparent structure which serves to help focus light at the retina (the back of the eye 250). The iris 258 is a relatively thin, circular diaphragm concentric with (and defining) the pupil 254. The iris 258 is the colored portion of the eye 250 which contracts to alter the size of the pupil 254, a circular hole through which light enters the eye 250. The fovea 262 is illustrated as a small indent on the retina. The fovea 262 corresponds to the area of retina which has the highest visual acuity.

Gaze direction is defined herein as the direction of a fovea axis 264, which is an axis that bisects a center of the fovea 262 and a center of the eye's pupil 254. Gaze direction corresponds to gaze position. In general, when a user's eyes look at a point, the foveal axes 254 of the user's eyes intersect at that point. As can be seen in FIG. 2B, the intersected C point on the electronic display element 235 indicates the gaze position. Note the as-drawn slight bend in the foveal axis 264 as it passes through the optics block 118, is due to the optics block 118 refracting the image light emitted from the electronic display element 235. A pupillary axis 266 is another axis of the eye 250 which is defined as the axis passing through the center of the pupil 254 which is perpendicular to the surface of the cornea 252. The pupillary axis does not, in general, directly align with the foveal axis 264. Both axes intersect at the center of the pupil 254, but the orientation of the foveal axis 264 is offset from the pupillary axis 266 by approximately −1° to 8° laterally and +4° vertically. The pupillary and foveal axes 235, 238 changes as the eye 250 moves.

The eye tracking unit 160 emits a controlled numerical aperture light beam 268 with a controlled wavefront that illuminates a region of interest (ROI) of the eye 250. The ROI is a portion of the eye, and can change as the gaze direction moves, dependent upon how large the beam size ("eyebox") is for the eye tracker. Depending upon the detection scheme employed, the ROI can be an area, a point, or a line. In addition, the ROI may include various depth levels of the illuminated portion (e.g., surface of the eye and regions below the surface of the eye). The ROI is typically sized relative to the acquisition speed of the dataset, in that faster (i.e., thousands of Hertz sampling over the ROI) data captures may have smaller regions (e.g., close to a millimeter). In contrast, slower (less than hundred Hertz for instance) data captures may result in ROIs being many millimeters in length and/or width. In this approach, the system can still locate unambiguously the position at any given data sample relative to previous and future datasets. This becomes a system trade therefore based upon the bandwidth, power, and volume allowed in the particular design embodiment. In some embodiments, the ROI is selected for easy detection, due to an obvious change between the signal from the ROI and other signals surrounding the ROI during eye movement. For example, the ROI may have an acceptable contrast, e.g., a position with strongest backreflection or backscattering from the edge of the user's sclera or cornea surface. The ROI may be located on, e.g., an edge of the sclera 260, surface of the cornea 252, a limbus (e.g., junction of the cornea 252 and sclera 260, a junction of the iris 258 and the sclera 260, a junction of the iris 258 and pupil 254, or any other suitable junction in the eye 250). In some embodiments, the eye tracking unit 160 emits light in a spectrum where the cornea 252 is nearly transparent (e.g., the near IR or visible spectrum), in the case in which part of the light beam in the sample path passes through cornea 252 and illuminates the iris 258 as the ROI. In some embodiments, the eye tracking unit 160 illuminates the vertex of the cornea 252 as the ROI, i.e., the part of the cornea 252 that extends furthest from the center of the eye 250.

The eye tracking unit 160 is set to a position for detecting light signals from a first illuminated portion of the eye at the ROI. As the eye moves, the ROI changes (i.e., illuminated portion of the eye changes), the eye tracking unit 160 detects the backreflected and/or backscattered light from other portions of the eye to determine the estimation of eye movement (in up to six (6) degrees-of-freedom, although at least two (2) would be required). This data is also correlated (bundle adjusted) into a "global" data set to map the eye features and refine future estimates through repeated scans over the same region.

Estimation of Eye Movement

Figure 3:
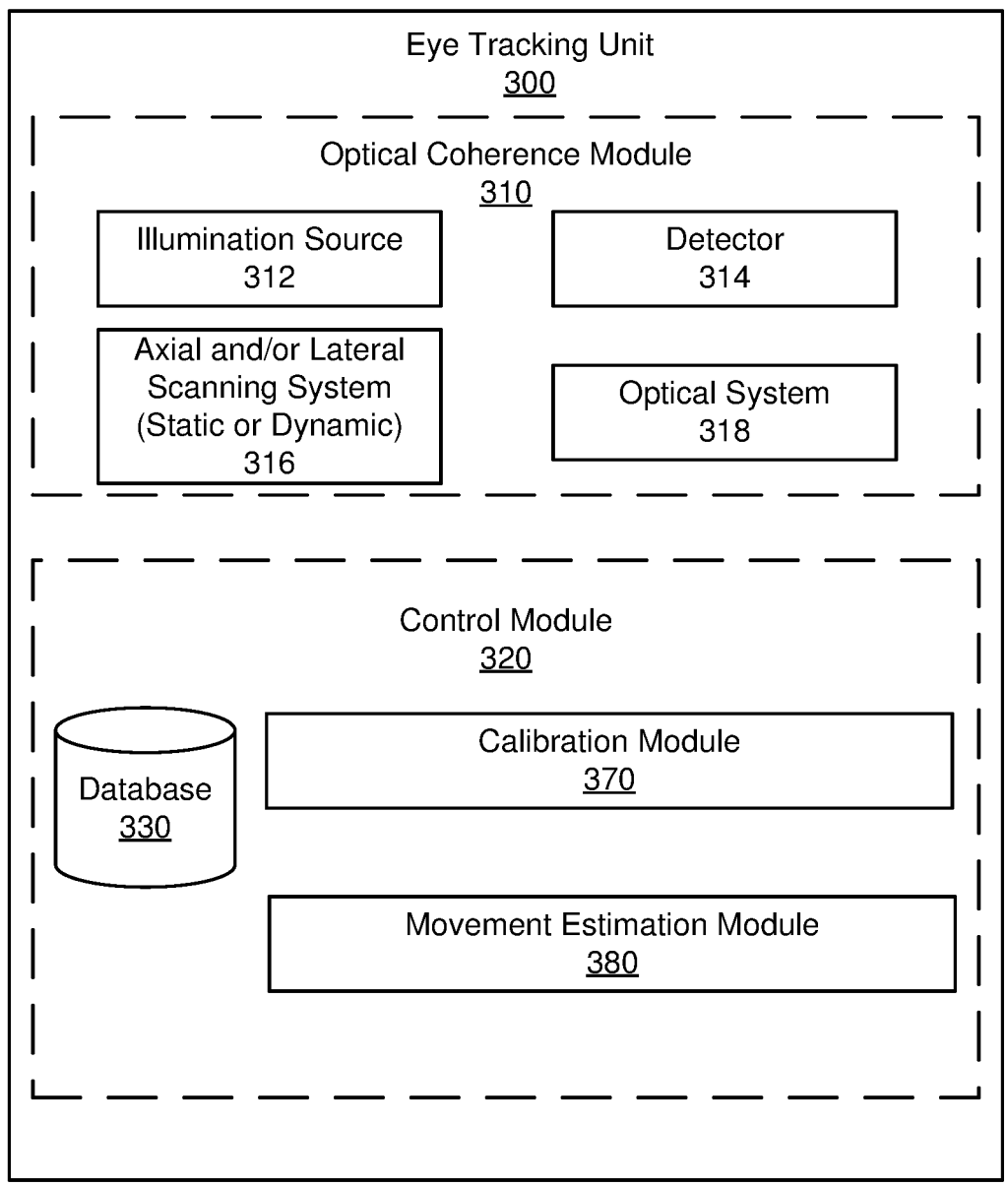
FIG. 3 is a block diagram of an eye tracking unit, in accordance with an embodiment.

FIG. 3 is a block diagram of an eye tracking unit 300, in accordance with an embodiment. The eye tracking unit 300 includes an OC module 310 and a control module 320. In some embodiments, the eye tracking unit 300 is the eye tracking unit 160 of the VR headset 105. In other embodiments, the eye tracking unit 300 is part of some other system, such as an AR system, that tracks positions and movements of a one or both eyes of a user. Some embodiments of the eye tracking unit 300 have different components than those described in conjunction with FIG. 3. Similarly, in embodiments, where the eye tracking unit 300 is part of a VR system environment, the functions described in conjunction with FIG. 3 may be distributed among other components in the VR system environment 100 in different manners in other embodiments. For example, some or all of the functionality provided by the control module 320 may be performed by the VR console 110.

The OC module 310 uses low coherent interfering wavefronts to isolate and measure the desired backreflected or backscattered light from an illuminated portion of the eye at one or more axial (longitudinal) positions (e.g., depth). Through manipulation of either the signal source characteristics or reference arm path, the path length (i.e., depth) difference becomes proportional to the phase interference, and is encoded on the measured signal. The low coherent interference is defined as independent optical signals that combine with the similar frequency and polarization states, but with different phase profiles which may either interfere constructively (strengthening in detected irradiance) if their light waves arrive in phase, or interfere destructively (weakening in irradiance) if they arrive out of phase, all within a finite coherence length (up to tens of millimeters, although usually less). The interference doesn't occur if differences in path length of waves are greater than the coherence length. This allows the system to isolate the signal of interest at a set depth boundary (defined in its axially dimension as up to the coherence length traditionally), and then if applicable, move the reference length (either through physical actuation, apparent reference arm path length, or source property changes) to measure characteristics at a different depth boundary. In one example, the low coherent interference occurs between a sample path capturing backreflected and backscattered light from a depth that includes a portion of the eye and a reference path capturing light from the reference mirror, as further explained in FIG. 4A and FIG. 4B.

In the example of FIG. 3, the OC module 310 estimates eye boundaries and features through overall differences in signal strength (contrast) that are measured over the ROI, including due to apparent index change of the user's eye by detecting the backreflected and/or backscattered light signal from the illuminated portion of the eye. The apparent index change may correspond to a change of refractive index, a change of contrast, a change of density, a change of time delay, a change of an intensity of backreflected and/or backscattered light from the portion of the eye, a change of anisotropy, a change of an optical property (such as birefringence), a change of an optical flow, or some other suitable parameter that is associated with the interference from the portion of the eye or some combination thereof. In addition, relative signal differences due to bulk transmission changes over the ROI are included in the apparent index measurement.

In one embodiment, the OC module 310 is set to a position for measuring an apparent contrast difference during eye movement. The initial set position corresponds to a ROI on the eye, and is seen to move across the eye boundary as related to the gaze direction changes.

As can be seen in FIG. 3, the OC module 310 includes an illumination source 312, a detector 314, a scanning system 316, and an optical system 318. Some embodiments of the OC module 310 have different components than those described in conjunction with FIG. 3. Similarly, the functions described in conjunction with FIG. 3 may be distributed among other components in the VR system environment 110 in different manners in other embodiments. For example, some or all of the functionality provided by the OC module 310 may be performed by the control module 320.

The illumination source 312 illuminates a portion of the user's eye that affects apparent index change with a predetermined illumination power. The predetermined illumination power is less than a threshold that causes injury to the eye. The illuminated portion of the user's eye is associated with the ROI. The illumination source 312 can be different types of low-coherence light sources in various embodiments. Examples of low-coherence light sources include: a super luminescent diode (SLD), a tunable wavelength laser (e.g., Ti: sapphire laser, Cr: Forsterite laser), a light emitted diode (LED), a short pulse laser (e.g., a laser diode), an ASE (Amplified Spontaneous Emission) light source, a fiber light source (e.g., photonic crystal fiber, Yb-doped fiber, Er-doped fiber, Tm-doped fiber), a thermal light source (e.g., tungsten halogen thermal lamp), a vertical-cavity surface-emitting laser (VCSEL), a laser diode of specific spectral content, a Xenon arc lamp, a light source that operates within 750 nm to 2,000 nm with a coherence length of 50 millimeters or less (driven by the depth resolution required), or some combination thereof. Sources with coherence lengths closer to the limit of single to multi-digit millimeters would be useful to sample the full depth range of the eye ROI while rejecting any extraneous light sources. In contrast, sources with coherence lengths closer to single or multi-digit micrometers would allow multiple depth planes to be isolated in the eye ROI. The illumination source 312 may provide point, line, or small area illumination depending on the type of illumination source 312, detector 314, and optical system 318. In some embodiments, the illumination source 312 is selected depending on, e.g., spectral width that defines the depth resolution and spectrometric resolution, numerical aperture (NA) that defines the lateral resolution, other factor that affects depth penetration or eye absorption and scattering, form factor, or some combination thereof. In some embodiments, the OC module 310 may include multiple illumination sources for illuminating one or more illuminated portions of the eye.

The scanning system 316 may laterally and/or axially scan. If the coherent length is below approximately one (1) millimeter, the scanning system 316 may be utilized to perform an axial scan. The scanning system 316 scans the illuminated portion of the eye at various axial positions (e.g., depth). In some embodiments, the scanning system 316 may include a reference system (e.g., reference mirror, nominally flat to spherical in shape). By varying a position of the reference system, the scanning system 316 is able to scan illuminated portion of the eye at various depths with scanning speed up to the order of kilohertz (kHz). An amount of the reference system's position to be varied limits the overall depth range (e.g., how deep the system can detect). Typically, the depth field of view is up to the order of millimeters. The scanning system 316 is not limited to use of a reference system, it can also use other configurations for obtaining signals at various axial positions. For example, the scanning system 316 may include a spectrometer for measurement or a wavelength tunable light source. In this configuration, the depth can be varied by controlling the wavelength profile and spectrum of the illumination source 312. The scanning system 316 may be set to a depth at the factory, or allow some finite change in depth plane to match the user interface before data acquisition. In this manner, the scanning system 316 would be fixed at a set position that corresponds to a particular depth on the illuminated portion of the eye for subsequent measurements, until corrections are required due to interface drift or user changes.

In alternative configuration, the scanning system 316 may also scan a surface of a portion of the eye for obtaining two-dimensional datasets. In order to track the eye position, at least a 2D (lateral, horizontal and vertical for instance) data set is required to fully bound the rotation/translation vectors. Thus, if the system does not capture this 2D dataset in a "snapshot" (which may be due to volume/power or light power/crosstalk limitations), then a lateral scanning system is required. Examples of the scanning system 316 for surface scanning may include: galvanometer scanning mirror, resonance scanning mirror, MEMS (Micro-Electro-Mechanical Systems)-based deformable mirror, a piezoelectric deformable mirror, other scanning element that provides high scanning speed, or some combination thereof.

The optical system 318 uses optical elements for light propagation among the illumination source 312, the detector 314, the scanning system 316, and the eye 250. Example optical elements include: an aperture, a grating, a lens, a mirror, a fiber, a fiber bundle or array, a filter, a prism, a polarizer, or another suitable optical element affecting illumination and light collection, or some combination thereof. The OC module 310 may include combinations of different optical elements. For example, the OC module 310 may include a beam splitter splitting a light beam into two. The beam splitter can be made from two triangular optical prisms, a half-silvered mirror, a sheet of glass or plastic with a transparently thin coating of metal, or a dichroic mirrored prism. The beam splitter can also be a solid-state waveguide, such as 2×2 fiber coupler described further in FIG. 4B. The fiber coupler is a device used in a fiber-based OC module to split light. For example, the fiber coupler includes one or more input fibers and one or more output fibers. The light beam from the illumination source 312 enters the input fiber and exits from one or more output fibers with equal or different power distribution, e.g., 80% of the light in the input fiber exits from one output fiber, 20% of the light in the input fiber exits from another output fiber. The fiber coupler can be single mode or multimode, or arrayed (created from multiple independent waveguides on each arm). As another example, the OC module 310 includes a collimator comprising mirrors or lenses for aligning light from the illumination source in a specific direction. The OC module 310 may also include a beam expander comprising prisms or lenses for expanding the light beam to illuminate a ROI. Additionally, the OC module 310 may include imaging lenses for collecting and mapping reflected lights from the ROI to the detector 314.

The OC module 310 may operate in a static or dynamic mode. The OC module 310 is in static mode when the scanning system 316 is at the set position (i.e., a reference mirror is at a set position). In static mode, apparent scene contrast changes for a particular depth level are collected. The OC module 310 is in dynamic mode when the scanning system 316 is dynamically changing the set position (e.g., the reference mirror is oscillating between two different positions, or source properties are manipulated to shift depth plane location). In dynamic mode, apparent scene contrast changes for a range of depth levels are collected.

The detector 314 detects backreflected and/or backscattered light from the illuminated portion of the eye. The detector outputs a detection signal proportional to the detected light. The detection signal corresponds to a reflectance of the illuminated portion of the eye which correlates with an apparent contrast change through the illuminated portion of the user's eye. The detector 314 is a device that converts light into electronic signals (e.g., photodetector). The detector 314 is capable of measuring changes in light, such as changes related to optical properties of the light (e.g., intensity, phase, polarization, wavelength and spectral distribution). The spectral sensitivity of the detector 314 may be in the visible band or infrared band depending on the illumination source 312. In some embodiments, the detector 314 may be based on single-point detection (e.g., photodiode, balanced/matched photodiodes, or avalanche photodiode), or based on one or two-dimensional detector arrays (e.g., linear photodiode array, CCD array, or CMOS array). In some embodiments, the OC module 310 may include multiple detectors to capture light reflected from one or more illuminated portions of the eye.

The control module 320 determines eye movement using OC data obtained from the OC module 310. The OC data is information that can be used to track eye movement. The OC data may include, e.g., illumination positions on the eye, detected information of the eye (e.g., apparent contrast change), axial positions (e.g., depth), temporal information, detected signals from the detector 314, any other suitable factor affecting eye movement, or some combination thereof. In the example shown by FIG. 3, the control module 320 includes a database 330, a calibration module 370, and a movement estimation module 380. These modules are software modules implemented on one or more processors, dedicated hardware units, or some combination thereof. Some embodiments of the control module 320 have different components than those described in conjunction with FIG. 3. Similarly, functions of the components described in conjunction with FIG. 3 may be distributed among other components in the VR system environment 100 in a different manner than described in conjunction with FIG. 3. For example, some or all of the functionality described as performed by the control module 320 may be performed by the VR console 110 and/or the OC module 310.

The database 330 stores calibration parameters from the VR console 110, OC data from the OC module 310, baseline data from the calibration module 370 describing trained or established baseline prior to eye tracking, and analysis data from movement estimation module 380 describing characterization parameters.

The calibration module 370 generates or trains baseline data prior to eye tracking. In one embodiment, the user is instructed to look at one or more virtual objects or visual indicators that are displayed at several baseline locations (e.g., corners, centers, other suitable locations affecting estimation of eye's positions, or some combination thereof) on the display screen (e.g., electronic display 115 of the VR headset 105). As the user gazes at each baseline location, the user's eye is positioned in a corresponding eye position, the calibration module 370 retrieves corresponding OC data collected by the OC module 310. The calibration module 370 generates calibration data by mapping the OC data for each baseline position to its corresponding eye positions. The calibration module 370 then interpolates the calibration data into a trained baseline (e.g., a lookup table), which is stored in the database 330. Once the calibration module 370 has produced the trained baseline, eye tracking may begin. In some embodiments, the calibration module 370 continues to update the trained baseline during subsequent eye tracking operation.

In some embodiments, the trained baseline may be a lookup table describing the relation between OC data and characterization parameters (e.g., vergence angle, etc.). The coordinate system of the trained baseline may be Cartesian space, polar coordinates, Plucker coordinates, or any other suitable coordinate system describing positions and directions in space. The trained baseline may be a two-dimensional (2D) or 3D model describing the structural information and movement of the eye. The 2D model may give an image along one direction of the surface and along an axial direction (e.g., a y-z image, or an x-z image in x-y-z coordinate system). The 2D map may be pixel-based, or texel-based (for example) depending on the coordinate system. The 3D model may give both surface and depth information of the eye (e.g., 3D image along x, y, and z direction). The 3D model may be voxel-based, infinite element method (FEM)-based (e.g., mesh-based), parameterized to a higher order function such as a polynomial, or any another suitable element that constitutes the 3D model.

In some embodiments, the trained baseline includes eye calibration parameters. Example eye calibration parameters include an estimated distance between a component of the eye tracking unit 300 and one or more parts of the eye such as the eye's center, pupil, cornea boundary, or a point on the surface of the eye. Other example eye calibration parameters may be specific to a particular user and include an estimated average eye radius, an average corneal radius, an average sclera radius, a map of features on the eye surface, and an estimated eye surface contour. In embodiments, the calibration parameters may include correction factors for intensity and color balance due to variations in light from outside the eye tracking unit 300.

Typically, the accuracy of eye position determination should be better than 0.5° of visual angle (e.g., the angle a viewed object subtends at the eye). Otherwise, the calibration module 370 may prompt the user to repeat the calibration for obtaining an updated trained baseline. In the context of a VR system, for example, if adjustment is needed (e.g., the accuracy doesn't become better during several recalibrations), the eye tracking unit 300 may communicate the VR console 110 to adjust some or all of the VR system environment 100 (e.g., prompt the user to adjust the angle and location of the VR headset 105, or prompt the user not to blink eyes).

The movement estimation module 380 estimates characterization parameters using OC data from the OC module 310 and/or the trained baseline from the calibration module 370. The OC data can be obtained from the static mode, or the dynamic mode of the OC module 310. In the static mode, the OC data includes one or more detection signals, illumination positions associated with eye movement, and temporal information associated with eye movement. Using the OC data the movement estimation module 380 retrieves a corresponding eye position from the trained baseline. In the dynamic mode, compared with the static mode, the OC data also includes further depth information (e.g., axial positions, and apparent index/contrast at each axial position) associated with the illumination position. For example, the OC data includes an area profile at each illumination position. The area profile can also have a depth aspect to relate between the detection signals and various axial positions. The corresponding trained baseline also includes the relation between the area profile at each illumination position and eye position. Accordingly, given OC data including this profile, the movement estimation module 380 is able to retrieve a corresponding eye position. In this manner, in either static or dynamic mode, the provided OC data allows the system to act as a fast coordinate transformation and global position. For instance, OC data from one set to the next in the series can be correlated, where the 2D correlation peak shows the offset in 2 dimensions that the eye traversed during that time integral/difference (similar to optical flow techniques). Then, especially over time as a database is populated, the OC dataset can act as a "fingerprint" to identify where the eye is current pointing based upon its unique features captured as compared to a larger volume of data, stored from the training and/or previous usage.

In some embodiments, the movement estimation module 380 determines one or more characterization parameters using OC data and/or the trained data set for one and/or both eyes of the user. The movement estimation module 380 may determine, for example, a fixation point, an inter-pupillary distance (IPD) of the user, a vergence angle, identification of the user, an eye's torsional state, or some other function that is based in part on the positions or movements of at least one of the user's eyes, or some combination thereof. For example, the movement estimation module 380 determines IPD (defined as the distance between the center of the pupils of the two eyes) by estimating eye position when the user looks straight. For another example, the movement estimation module 380 determines vergence angle by estimating gaze angle when the user changes viewing distance and gaze direction. The movement estimation module 380 is also able to determine the eye's torsional state by estimating the rotation of the eye about the pupillary axis. In some embodiments, the movement estimation module 380 is able to determine the foveal axis, the orientation of the foveal axis from the pupillary axis, and a change in the shape of the eye.

Example Eye Tracking Unit

Figure 4A:
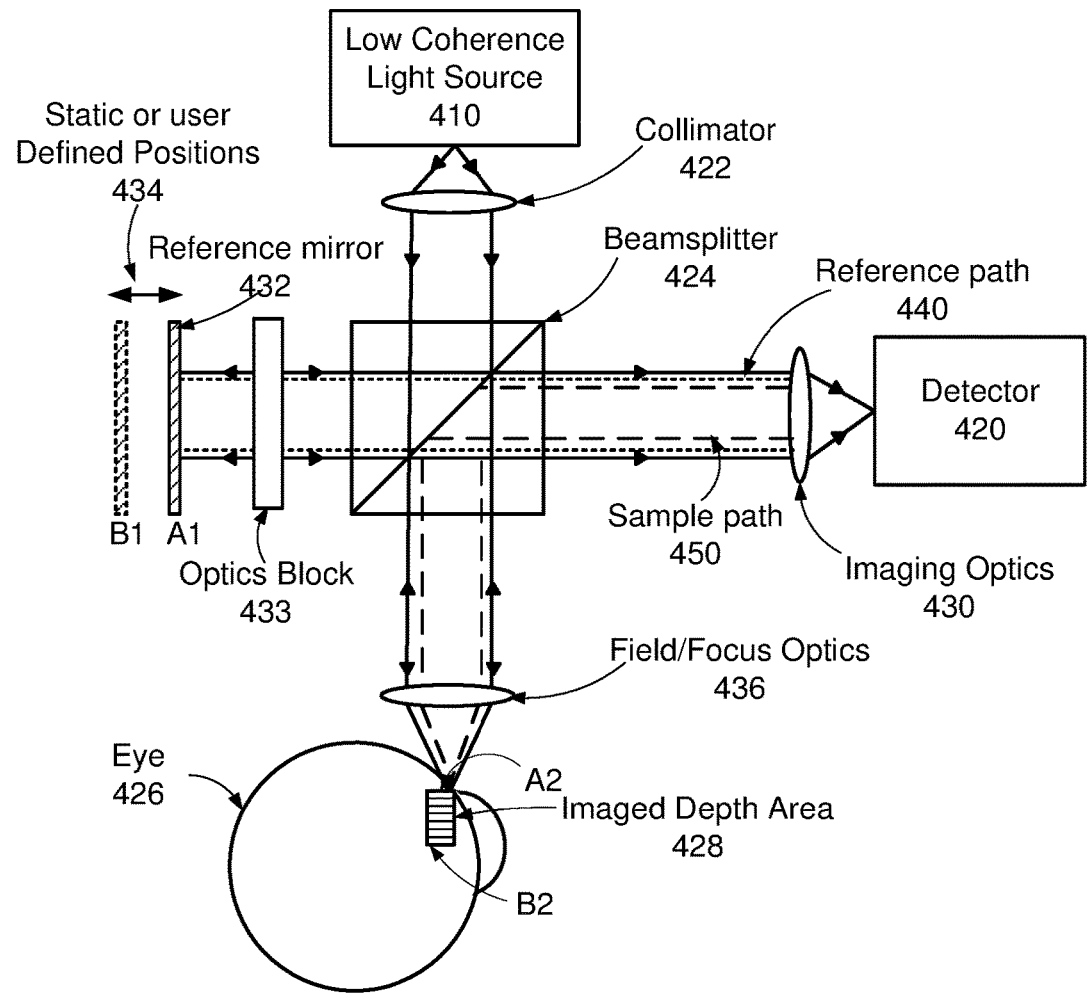
FIG. 4A depicts a block diagram of an eye tracking unit using an optical coherence module, in accordance with an embodiment.

FIG. 4A depicts a block diagram of an eye tracking unit 300 using an OC module 400A, in accordance with an embodiment. In some embodiments, the OC module 400A is a component of the eye tracking unit 300. In alternate embodiments, the OC module 400A is part of a VR headset, an AR headset, a VR/AR system that is not a headset, or some other system and/or headset which employs eye tracking. FIG. 4A depicts a single OC module 400, including a low coherence light source 410, a detector 420, a collimator 422, a beam splitter 424, an imaged depth area 428, imaging optics 430, a reference mirror 432, optics block 433, and field/focus optics 436. However, in alternate embodiments, the single OC module 400 may include multiple coherent light sources 410, multiple reference mirrors 432, or multiple detectors 420 for detecting a single eye or dual eyes. Similarly, for single eye detection, a corresponding OC module 400 may be employed for the other eye.

The low coherent interference occurs between a sample path 450 (shown in dot line in FIG. 4A) capturing backreflected and backscattered light from the eye 426 and a reference path 440 (shown in dash line in FIG. 4A) capturing light from the reference mirror 432. These paths are shown as being separated and re-combined through a beam splitter 424, but it may also be nearly common path, such as a "Mirau" style objective design. A light beam from the low coherence light source 410 is aligned by a collimator 422 in a specific propagation direction. A beam expander can also be used to expand the light beam widely and uniformly (not shown in FIG. 4A) before directing the light beam to the beam splitter 424. The beam splitter 424 splits the light beam from the low coherence light source 410 into two light beams. One light beam in the reference path 440 is directed to the reference mirror 432 by the beam splitter 424 via the optics block 433 and the other light beam in the sample path 450 is focused by field/focusing optics 436 to illuminate a portion of a user's eye 426. The optics block 433 is used to disperse the light beam, or attenuate the light beam, or make focus correction of the light beam in the reference path 440, or realize any other suitable function that modifies the light beam in the reference path 440. Both the reflected light from the reference mirror 432 in the reference path 440 and the backreflected or backscattered light from the illuminated portion of the eye 426 in the sample path 450 are directed back to the beam splitter 424 and are focused onto a detector 420 via the imaging optics 426. The detector 420 detects the interference between the light beams from both paths for estimating apparent contrast change. The interference between the light beams from both the reference path 440 and the sample path 450 occurs when the light beams from both paths have traveled the "same" optical path length ("same" meaning a difference of less than the short coherence length of the source). In other words, the distance to the reference mirror 432 is equal to the axial distance within the illuminated portion of the eye. Thus, by varying static or user defined positions 434 of the reference mirror 422, the OC module 400A is able to obtain signals at various axial positions (e.g., various depths). For example, when the reference mirror 432 varies positions 434 from A1 to B1 position, the imaged depth area 428 (up to the order of millimeters) of the illuminated portion of the eye is from A2 to B2 position accordingly. The optical path lengths of the reference mirror 432 at A1 and B1 positions are equal to the optical lengths of the imaged portion of the eye at A2 and B2 positions, respectively.

Figure 4B:
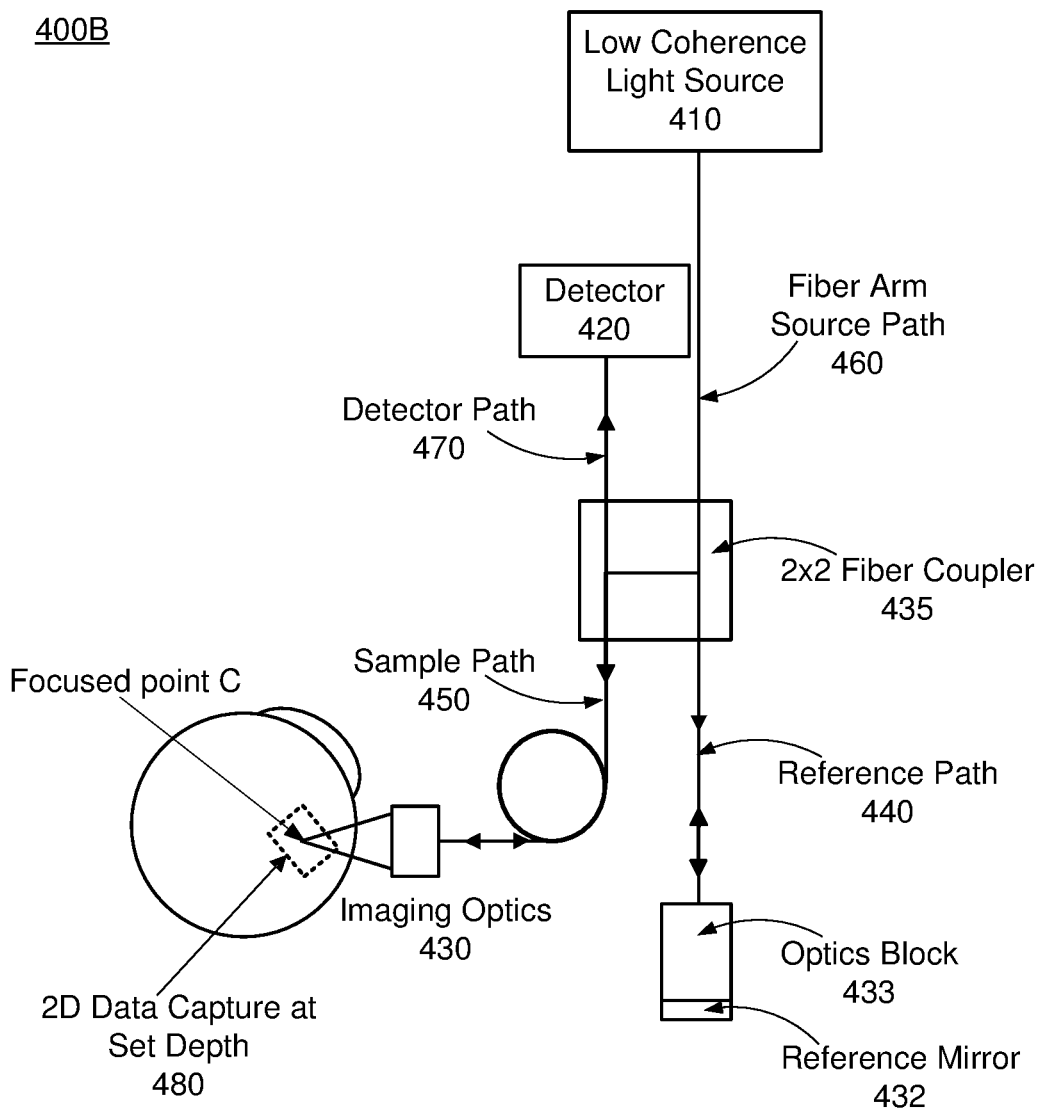
FIG. 4B depicts a block diagram of an eye tracking unit utilizing an optical coherence module based upon a fiber coupler, in accordance with an embodiment.

In alternative configuration, combined with a surface scanning system (not shown in FIG. 4A), the OC module 400A scans the light beam on the illuminated portion of the eye in a linear surface scanning pattern (e.g., along a line on the surface of the eye 426) to obtain a 2D image (e.g., spatial information along one direction at multiple depth levels, e.g., X-Z image, or Y-Z image) of the scanned portion of the eye 426. Additionally, the OC module 400A scans the light beam on the illuminated portion of the eye in an array surface scanning pattern (e.g., of a slice of the eye). For example, the OC module 400A covers a region with the scanned light beam on the illuminated portion of the eye and can record a 2D image (X/Y sampled data set at a given depth Z) within a single time/exposure frame of the eye 426, as further explained in FIG. 4B. For another example, the OC module 400A is able to obtain a 3D image (e.g., X/Y sampled data at multiple depth levels in the eye 426). In some embodiments, the OC module 400 is able to detect the depth up to the order of many millimeters and to provide axially and lateral resolution on the surface with the order of microns. FIG. 4B depicts a block diagram of an eye tracking unit 300 utilizing an OC module 400B based upon a fiber coupler 435, in accordance with an embodiment. FIG. 4B provides an alternative architecture for the OC module. Light propagation in FIG. 4B is via one or more optical fibers, whereas, the light propagation in FIG. 4A is in free space (e.g., air). Compared with FIG. 4A, FIG. 4B includes a 2×2 fiber coupler 435, a fiber arm source path 460, and a detector path 470.

Here, a low coherence light source 410 is coupled via the 2×2 fiber coupler 435 (e.g., 80/20 Split, sample path (80%) vs. reference path (20%)). At the junction from the low coherence light source 410 to the 2×2 fiber coupler 435, a portion (e.g., for example 20%) of the light in the fiber arm source path 460 goes to the reference path 440, and an equal or larger portion (e.g., 80%) of the light in the fiber arm source 460 goes to the sample path 450. The reference path 440 includes an optics block 433 to provide for dispersion, attenuation, and (optional) focus correction. The light in the reference path 440 is then incident and reflected from a reference mirror 432, and goes back into the 2×2 fiber coupler 435. The light in the sample path 450 similarly goes through imaging optics 430 to be relayed into the imaged ROI of the eye, as shown with a focused point C, but it can also be a line, cross, or other area or region (not shown in FIG. 4B). Backscattered and backreflected light from the focused point C is then coupled back into the sample path 450, and goes back to the 2×2 fiber coupler 435. At least some portions of signals from both the sample and reference path are then coupled into the detector path 470, which allows for the incoherent and (desired) coherent interference to occur and provide information on the contrast variation at a set depth.

In FIG. 4B, the fiber path is a single waveguide, which supports a single data point capture at any given time interval. This supports a solid-state manner to vary the depth of the signal retrieval through "Fourier" or "swept source" optical coherence techniques. In addition, the output optical system of the sample path 450 provides for a manner to change the spatial coordinate of the data point by a surface scanning system (such as a 2D galvanometer mirror, MEMS mirror, variable transmission element, or similar mechanism) to either move the coupled point back into the fiber or control the focused light beam in the eye 426. This allows both 2D (spatial XY data at a given depth plane Z, e.g., 2D data capture at set depth 480) and 3D (spatial XY dataset at multiple depth levels) datasets to be captured through temporal sampling. In alternative embodiments, this fiber could be an array, and support simultaneous capturing of multiple spatial coordinates at a given depth plane (through the use of a 1 or 2D detector 420 implementation).

Figure 5:
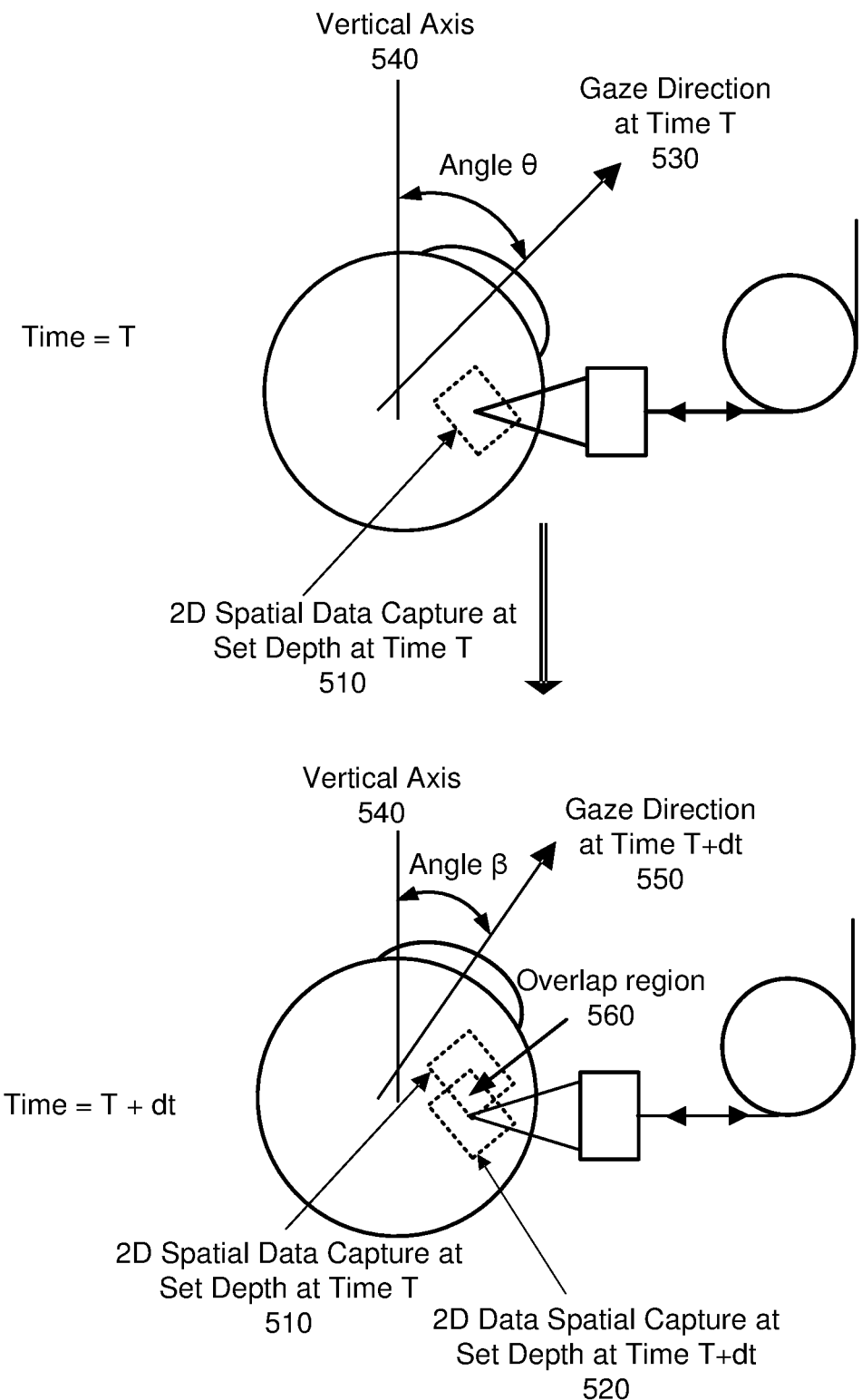
FIG. 5 depicts two data captures of a single eye, as based upon the layout provided in FIG. 4B, to illustrate a method to track eye movement, in accordance with an embodiment.

FIG. 5 depicts two data captures of a single eye, as based upon the layout provided in FIG. 4B, to illustrate a method to track eye movement, in accordance with an embodiment. FIG. 5 further illustrates the concept of operation for an acceptable correlation mapping from one dataset to a subsequent dataset. Here, at a given time interval dt, 2D spatial data capture at a set depth at time T 510 was obtained, and then at some subsequent later time T+dt, another 2D spatial data capture at the set depth at time T+dt 520 is obtained. The 2D dataset 510 corresponds to the eye position defined by the angle $\theta$ between the vertical axis 540 and the gaze direction 530 at time T. The 2D dataset 520 corresponds to the eye position defined by the angle 3 between the vertical axis 540 and the gaze direction 550 at time T+dt. Due to the eye movement from the angle $\theta$ to the angle $\theta$, there is an offset (or a displacement) between the 2D datasets 510 and 520. As shown in FIG. 5B, there is an overlap region 560 between the two datasets 510 and 520. Based on the differences between the overlap region 560 in each dataset, the offset between the two datasets is determined. The offset corresponds to the eye movement position from the angle $\theta$ to the angle 3 in the time interval dt. In some embodiments, as both datasets are correlated together, the offset can be represented in a Cartesian coordinates (e.g., an X/Y-axis). The offset is able to provide an acceptable value corresponding to the eye 426 position moved between the identified time interval.

Figure 6:
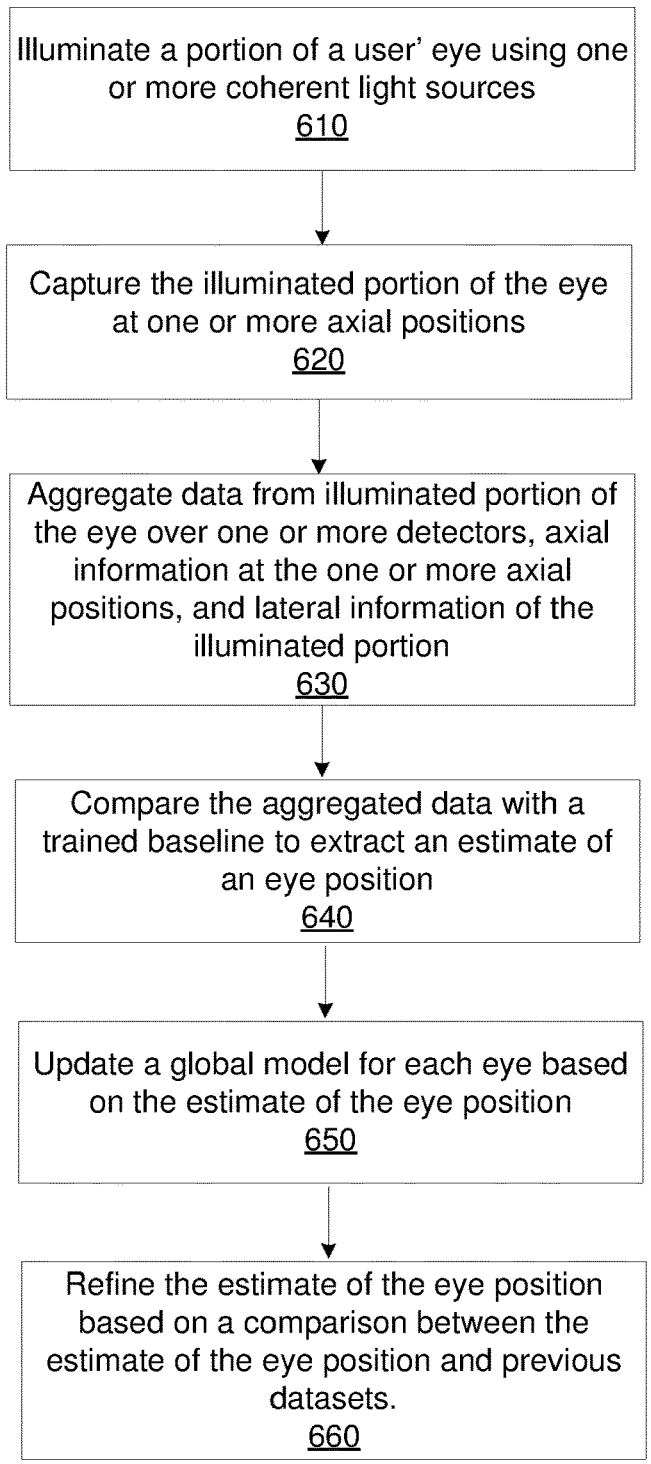
FIG. 6 is a flowchart of a process for tracking eye movement, in accordance with an embodiment.

FIG. 6 is a flowchart of one embodiment of a process 600 for tracking eye movement, in accordance with an embodiment. The process 600 may be performed by the eye tracking unit 300 in some embodiments. Alternatively, other components may perform some or all of the steps of the process 600. Additionally, the process 600 may include different or additional steps than those described in conjunction with FIG. 6 in some embodiments or perform steps in different orders than the order described in conjunction with FIG. 6.

The eye tracking unit 300 illuminates 610 a portion of a user's eye using one or more coherence light sources. For example, a low coherence light source of the eye tracking unit 300 illuminates a point, or a line, or a cross, or a small area of a user's cornea surface, as described above in conjunction with FIGS. 3, 4A, and 4B.

The eye tracking unit 300 captures 620 the illuminated portion of the eye at one or more axial positions (depths). The axial position is determined by a position of a reference mirror or the source characteristics (such as spectrum). For example, in static mode, the eye tracking unit 300 collects data from the illuminated portion of the eye at a specific axial position by fixing the position of the reference mirror. In a particular example, the specific axial position is on the surface of the illuminated portion of the eye. In dynamic mode, the eye tracking unit 300 collects data from the illuminated portion of the eye at various axial positions by varying positions of the reference mirror.

The eye tracking unit 300 aggregates 630 data (i.e., detection signals) from the illuminated portion of the eye over one or more detectors, axial information at the one or more axial positions, and lateral information of the illuminated portion. For example, the eye tracking unit 300 detects the backreflected and/or backscattered light from the illuminated portion of the eye at one focused position in static mode, or at various axial positions in dynamic mode. The detection signal corresponds to a reflectance of the illuminated portion of the eye which correlates with an apparent index change through the illuminated portion of the eye.

The eye tracking unit 300 compares 640 the aggregated data with a trained baseline to extract an estimate of an eye position. For example, the eye tracking unit 300 is able to extract the estimate of the eye positions by mapping the illumination positions to the trained baseline. The trained baseline describes the relation between the illumination positions and eye positions.

The eye tracking unit 300 updates 650 the trained baseline for each eye based on the estimate of the eye position. For example, the eye tracking unit 300 updates the trained baseline of the eye position based on the aggregated data and the estimate of the eye position. This allows the system to refine eye movement magnitude and direction during that frame by taking into account previous knowledge of the eye and measurement features.

The eye tracking unit 300 refines 660 the estimate of the eye position based on a comparison between the estimate of the eye position and previous datasets. The previous datasets may include captured data, aggregated data, estimates of eye positions, and any other suitable data related to the eye tracking. For example, the latest dataset may be over a region that has had many previous datasets, which can allow correlation and bundle adjustment with multiple measurements over the same region to improve the estimate on current eye position and gaze direction. In some embodiments, this process may then be repeated with an interim update to tracking filters, such as optical flow predictions as an example, for a given capture, as discussed in conjunction with FIG. 5.

In some embodiments, the eye tracking unit 300 determines functional and structural information of an eye for identifying a user. For example, the eye tracking unit 300 is able to determine the apparent index change of the iris during eye movement to get a structural pattern map for each user. The eye tracking unit 300 can also create a 3D model for a user' eye structure (e.g., iris) for identification and mapping global eye coordinates during end-use.

Other Modalities of OC

In some embodiments, the eye tracking unit 300 is not limited to the embodiment using a time-domain optical system in a free space using two beam paths (e.g., reference path and sample path for generating interference) shown in FIG. 4A. The eye tracking unit 300 can also have other embodiment that uses interference to detect structural and/or functional information of a user's eye. For example, the eye tracking unit 300 may use a fiber-based OC as described in FIG. 4B. Compared with the free-space OC system shown in FIG. 4A, the light propagates via optical fibers or waveguides instead of air, and the beam splitter may be replaced by a fiber/wave coupler to direct light to the reference path and the sample path. For another example, the eye tracking unit 300 may use dual-beam based OC. Compared with the OC system in FIG. 4A and FIG. 4B, the eye is illuminated by two interference beams via two reference mirrors, whereas, in FIG. 4, the eye is only illuminated by the beam in the sample path and only one reference mirror is used. Additionally, the eye tracking unit 300 may use not only an OC system based on single-point detection techniques (e.g., photodiode for detection), but also use an OC system based on linear or two-dimensional detector arrays (e.g., CCD camera, CMOS detector array). In some embodiments, the eye tracking unit 300 may use a frequency-domain OC technique (e.g., spectral-domain or Fourier domain OC, and swept source OC). For example, compared with the OC system in FIG. 4A, the Fourier-domain OC uses spectrometric measurement to realize depth-scan instead of mechanically sweeping the reference mirror. In one embodiment, a spectrometer replaces the detector in the Fourier-domain OC, for example, a diffraction grating and detector array may be used. The eye tracking unit 300 is not limited to the above embodiments. For example, the eye tracking unit 300 may use other techniques to improve contrast and resolution to support eye tracking needs, such as polarization sensitive, Doppler, spectroscopic, multi-wavelength, and phase-contrast OC techniques.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. An eye tracking device comprising:
   an illumination source configured to project low coherence interference light onto a portion of a user's eye via a scanning system, wherein the portion of the user's eye is a portion of the user's sclera, cornea, or limbus;

the scanning system configured to scan an illuminated portion of the user's eye with the low coherence interference light from the illumination source at one or more different depths below a surface of the user's eye, wherein the scanning of the one or more different depths is performed along a longitudinal axis that intersects the illuminated portion of the user's eye;

a detector configured to collect, for each of the one or more different depths, reflected low coherence interference light from the illumination source reflected from the illuminated portion of the user's eye, the reflected low coherence interference light from the illuminated portion of the user's eye at each of the one or more different depths of a plurality of different depths; and a controller configured to:
  determine, for each of the one or more different depths, measurement data characterizing the illuminated portion of the user's eye based on the reflected low coherence interference light collected for each of the one or more different depths,
  compare the measurement data with a trained baseline, and
  determine an eye position based on the comparison.

2. The eye tracking device of claim 1, wherein the one or more different depths are based in part on a coherent length of the illumination source.

3. The eye tracking device of claim 1, wherein the illuminated portion of the user's eye includes a region of interest, wherein the region of interest is selected from a group consisting of: a first area located on an edge of the user's sclera, a second area located on a surface of the user's cornea, a third area located on the user's limbus, a first point located on the edge of the user's sclera, a second point located on the surface of the user's cornea, a third point located on the user's limbus, a first line located on the edge of the user's sclera, a second line located on the surface of the user's cornea, a third line located on the user's limbus, or some combination thereof.

4. The eye tracking device of claim 1, the scanning system is further configured to vary the one or more different depths within the illuminated portion of the user's eye to scan the illuminated portion of the user's eye at various depths along the longitudinal axis.

5. The eye tracking device of claim 1, wherein the scanning system is a reference mirror.

6. The eye tracking device of claim 1, wherein the scanning system is further configured to vary a wavelength of the illumination source, and the detector is further configured to detect a spectrum of light scattered from the illuminated portion of the user's eye.

7. The eye tracking device of claim 1, wherein the scanning system is further configured to vary a lateral position of the illuminated portion of the user's eye at each of the one or more different depths, wherein the lateral position is orthogonal to each of the plurality of different depths.

8. The eye tracking device of claim 1, wherein the measurement data is selected from a group consisting of: a 1D dataset collected at a given lateral position and at a given depth associated with the illuminated portion of the user's eye, a 2D dataset at the given lateral position and at the plurality of different depths associated with the illuminated portion of the user's eye, a 2D dataset collected at multiple lateral positions and at the given depth associated with the illuminated portion of the user's eye, a 3D dataset collected at multiple lateral positions and at the plurality of different depths associated with the illuminated portion of the user's eye, or some combination thereof.

9. The eye tracking device of claim 1, wherein the controller is further configured to update the trained baseline based in part on the determined eye position and the measurement data.

10. The eye tracking device of claim 1, wherein the controller is further configured to refine the determined eye position based in part on a comparison between the determined eye position and previous datasets associated with the determined eye position.

11. The eye tracking device of claim 10, wherein the previous datasets comprise previous measurement data associated with a same illuminated portion of the user's eye, previous determined eye positions associated with the same illuminated portion of the user's eye, or both.

12. The eye tracking device of claim 1, the controller is further configured to identify an overlap region of a plurality of measurement data collected from the detector at different time points;
  identify differences between the overlap region in the plurality of measurement data; and
  determine an eye position based in part on the identified differences.

13. The eye tracking device of claim 1, wherein the eye tracking device is a fiber-based tracking device.

14. A method for eye tracking comprising:
  projecting low coherence interference light onto a portion of a user's eye using one or more coherent light sources of a scanning system comprising a moveable reference mirror, wherein the portion of g user's eye is a portion of the user's sclera, cornea, or limbus;
  capturing, using a detector collecting the projected low coherence interference light reflected from an illuminated portion of the user's eye, measurement data characterizing the illuminated portion of the user's eye at each of one or more different depths of a surface of the user's eye, along a longitudinal axis that intersects the illuminated portion of the user's eye;
  aggregating the measurement data characterizing the illuminated portion of the user's eye at each of the one or more different depths;
  comparing the aggregated measurement data with a trained baseline; and
  determining an eye position based the comparison.

15. The method of claim 14, wherein the measurement data is selected from a group consisting of: a 1D dataset collected at a given lateral position and at a given depth associated with the illuminated portion of the user's eye, a 2D dataset at the given lateral position and at a plurality of different depths associated with the illuminated portion of the user's eye, a 2D dataset collected at multiple lateral positions and at the given depth associated with the illuminated portion of the user's eye, a 3D dataset collected at multiple lateral positions and at the plurality of different depths associated with the illuminated portion of the user's eye, or some combination thereof.

16. The method of claim 14, wherein the method further comprises updating the trained baseline based in part on the determined eye position and the aggregated measurement data.

17. The method of claim 14, wherein the method further comprises refining the determined eye position based in part on a comparison between the determined eye position and previous datasets associated with the determined eye position.

18. The method of claim 17, wherein the previous datasets comprise previous measurement data associated with a same illuminated portion of the user's eye, pervious determined eye positions associated with the illuminated portion of the user's eye, or both.

19. An eye tracking device comprising:
- an illumination source configured to project low coherence interference light onto a portion of a user's eye via a scanning system, wherein the portion of the user's eye is a portion of the user's sclera, cornea, or limbus;
- a reference mirror configured to scan an illuminated portion of the user's eye with the low coherence interference light from the illumination source at one or more different depths below a surface of the user's eye via varying a location of the reference mirror, wherein scanning a plurality of one or more different depths are along a longitudinal axis that intersects the illuminated portion of the user's eye;
- a detector configured to collect, for each of the one or more different depths, reflected low coherence interference light reflected from the illuminated portion of the user's eye, the reflected low coherence interference light from the illuminated portion of the user's eye at each of the plurality of one or more different depths; and
- a controller configured to:
  - determine, for each of the one or more different depths, measurement data characterizing the illuminated portion of the user's eye based on the reflected low coherence interference light collected for each of the one or more different depths;
  - compare the measurement data with a trained baseline, and
  - determine an eye position based the comparison.

20. The eye tracking device of claim 19, wherein the reference mirror oscillates between two different locations to select each of the one or more different depths.

* * * * *

UNITED STATES PATENT AND TRADEMARK OFFICE
CERTIFICATE OF CORRECTION

PATENT NO. : 10,832,051 B1
APPLICATION NO. : 15/593555
DATED : November 10, 2020
INVENTOR(S) : Nicholas Daniel Trail and Robert Dale Cavin Page 1 of 1

It is certified that error appears in the above-identified patent and that said Letters Patent is hereby corrected as shown below:

On the Title Page

Column 2, Abstract (57), Line 13, delete "determine an eye position based the comparison." and insert -- determine an eye position based on the comparison. --

In the Claims

Column 22, Claim 14, Line 32, delete "wherein the portion of g user's eye" and insert -- wherein the portion of the user's eye --

Column 22, Claim 14, Line 46, delete "determining an eye position based the comparison." and insert -- determining an eye position based on the comparison. --

Column 24, Claim 19, Line 15, delete "determine an eye position based the comparison." and insert -- determine an eye position based on the comparison. --

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*